United States Patent
Lau et al.

(10) Patent No.: US 9,706,047 B2
(45) Date of Patent: Jul. 11, 2017

(54) VIDEO PRESENCE SHARING

(71) Applicant: T-Mobile USA, Inc., Bellevue, WA (US)

(72) Inventors: Kevin Lau, Issaquah, WA (US); Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/813,946

(22) Filed: Jul. 30, 2015

(65) Prior Publication Data

US 2015/0341491 A1 Nov. 26, 2015

Related U.S. Application Data

(63) Continuation of application No. 13/211,155, filed on Aug. 16, 2011, now Pat. No. 9,131,103.

(60) Provisional application No. 61/390,974, filed on Oct. 7, 2010.

(51) Int. Cl.
*H04M 3/46* (2006.01)
*H04M 3/42* (2006.01)
*H04N 7/14* (2006.01)

(52) U.S. Cl.
CPC .......... *H04M 3/42365* (2013.01); *H04N 7/14* (2013.01); *H04N 7/141* (2013.01); *H04N 7/148* (2013.01)

(58) Field of Classification Search
USPC .................. 379/202.01; 348/14.01–14.14
See application file for complete search history.

(56) References Cited

U.S. PATENT DOCUMENTS

| | | |
|---|---|---|
| 6,222,841 B1 | 4/2001 | Taniguchi |
| 6,731,325 B1 | 5/2004 | Qi et al. |
| 7,072,678 B2 | 7/2006 | Allison |
| 7,103,669 B2 | 9/2006 | Apostolopoulos |
| 7,171,460 B2 | 1/2007 | Kalavade et al. |
| 7,418,497 B2 | 8/2008 | Hagale et al. |
| 7,689,650 B1 | 3/2010 | Sanghavi et al. |

(Continued)

FOREIGN PATENT DOCUMENTS

| | | |
|---|---|---|
| CN | 101019459 | 8/2007 |
| CN | 101198174 | 6/2008 |

(Continued)

OTHER PUBLICATIONS

Translated Chinese Office Action mailed Oct. 8, 2015 for Chinese patent application No. 2011800571642, a counterpart foreign application of U.S. Appl. No. 13/189,281, 20 pages.

(Continued)

*Primary Examiner* — Maria El-Zoobi
(74) *Attorney, Agent, or Firm* — Lee & Hayes, PLLC (57) ABSTRACT

Video calling devices are described herein that are configured to exchange video presence statuses with each other. Each of these video calling devices determines its presence status based at least on its network connection type, its login status for a video calling service, and its camera status and provides the presence status to the video calling service. Each video calling device also receives presence statuses of other video calling devices. This exchange of presence statuses enables initiation of video calls between the video calling devices.

19 Claims, 5 Drawing Sheets

(56) References Cited

U.S. PATENT DOCUMENTS

| | | | |
|---|---|---|---|
| 7,701,925 B1 | 4/2010 | Mason et al. | |
| 7,787,445 B2 | 8/2010 | Marsico | |
| 7,899,862 B2 | 3/2011 | Appelman et al. | |
| 8,115,797 B2 | 2/2012 | Whited et al. | |
| 8,358,762 B1 * | 1/2013 | Renner | H04M 3/42365 379/202.01 |
| 8,370,432 B2 * | 2/2013 | Digate | G06Q 10/107 370/401 |
| 2001/0034222 A1 | 10/2001 | Roustaei et al. | |
| 2002/0196923 A1 * | 12/2002 | Donnelly | H04M 3/46 379/219 |
| 2004/0186887 A1 | 9/2004 | Galli et al. | |
| 2004/0207508 A1 | 10/2004 | Lin et al. | |
| 2005/0108417 A1 | 5/2005 | Haumont | |
| 2005/0210104 A1 * | 9/2005 | Torvinen | G06Q 10/10 709/205 |
| 2005/0238156 A1 * | 10/2005 | Turner | H04L 12/1818 379/202.01 |
| 2005/0259601 A1 | 11/2005 | Rosenberg et al. | |
| 2006/0023729 A1 | 2/2006 | Choi et al. | |
| 2006/0101116 A1 | 5/2006 | Rittman et al. | |
| 2006/0256772 A1 | 11/2006 | Yarlagadda | |
| 2006/0268751 A1 | 11/2006 | Baird et al. | |
| 2006/0277256 A1 * | 12/2006 | Tiruthani | H04N 7/147 709/206 |
| 2007/0156924 A1 | 7/2007 | Ramalingam et al. | |
| 2008/0005119 A1 * | 1/2008 | Fernandez | G06Q 10/109 707/999.01 |
| 2008/0043644 A1 | 2/2008 | Barkley et al. | |
| 2008/0137541 A1 | 6/2008 | Agarwal et al. | |
| 2008/0244019 A1 | 10/2008 | Mellor et al. | |
| 2008/0267069 A1 | 10/2008 | Thielman et al. | |
| 2009/0005037 A1 | 1/2009 | Noldus et al. | |
| 2009/0034610 A1 | 2/2009 | Lee et al. | |
| 2009/0069057 A1 | 3/2009 | Haartsen et al. | |
| 2009/0116458 A1 | 5/2009 | Ramesh et al. | |
| 2010/0034106 A1 | 2/2010 | Hu et al. | |
| 2010/0040347 A1 | 2/2010 | Kent, Jr. et al. | |
| 2010/0118114 A1 | 5/2010 | Hosseini et al. | |
| 2010/0121977 A1 | 5/2010 | Kontola et al. | |
| 2010/0229210 A1 | 9/2010 | Sharp et al. | |
| 2010/0235423 A1 * | 9/2010 | Lee | H04L 67/24 709/202 |
| 2010/0272101 A1 | 10/2010 | Ku et al. | |
| 2010/0316066 A1 | 12/2010 | Leung | |
| 2011/0025820 A1 * | 2/2011 | Fisher | H04L 67/24 348/14.08 |
| 2011/0047581 A1 * | 2/2011 | Caspi | H04L 12/66 725/80 |
| 2011/0249073 A1 | 10/2011 | Cranfill et al. | |
| 2011/0249086 A1 | 10/2011 | Guo et al. | |
| 2011/0250869 A1 * | 10/2011 | Mahajan | H04W 76/02 455/412.1 |
| 2012/0079016 A1 * | 3/2012 | Hung | H04L 12/581 709/203 |
| 2012/0140018 A1 | 6/2012 | Pikin et al. | |
| 2013/0301482 A1 * | 11/2013 | Katis | H04L 29/06176 370/276 |

FOREIGN PATENT DOCUMENTS

| | | |
|---|---|---|
| CN | 101442388 A | 5/2009 |
| CN | 101843074 | 9/2010 |
| CN | 101855877 A | 10/2010 |
| GB | 2348089 A | 9/2000 |
| WO | WO2005055504 A1 | 6/2005 |
| WO | WO2006012911 A1 | 2/2006 |
| WO | WO2007016472 A2 | 2/2007 |
| WO | WO2008070869 A2 | 6/2008 |
| WO | WO2008086509 | 7/2008 |
| WO | WO2010052570 A1 | 5/2010 |

OTHER PUBLICATIONS

The Extended European Search Report mailed Jun. 29, 2015 for European patent application No. 12844332.2, 8 pages.

Office Action for U.S. Appl. No. 13/211,155, mailed on Dec. 15, 2014, Kevin Lau, "Video Presence Sharing", 10 pages.

Office Action for U.S. Appl. No. 13/211,155, mailed on Dec. 30, 2013, Kevin Lau, "Video Presence Sharing", 11 pages.

Final Office Action for U.S. Appl. No. 13/211,155, mailed on Mar. 17, 2015, Kevin Lau, "Video Presence Sharing", 7 pages.

Final Office Action for U.S. Appl. No. 13/211,155, mailed on May 29, 2014, Kevin Lau, "Video Presence Sharing", 11 pages.

Office action for U.S. Appl. No. 13/658,745, mailed on Jun. 24, 2014, Tapia et al., "Optimizing Video-call Quality of Service", 13 pages.

Office Action for U.S. Appl. No. 13/189,281, mailed on Aug. 9, 2013, Lau et al, "Rate Adaptation for Video Calling", 9 pages.

The PCT Search Report and Written Opinion mailed Mar. 29, 2013 for PCT Application No. PCT/US12/61608, 11 pages.

The PCT Search Report and Written Opinion mailed May 4, 2012 for PCT Application No. PCT/US11/54785, 9 pages.

Translated Chinese Second Office Action mailed Apr. 26, 2016 for Chinese Patent Application No. 201180057164.2, a counterpart foreign application of U.S. Pat. No. 8,723,913, 30 pages.

The Chinese Office Action mailed Jul. 15, 2016 for Chinese Patent Application No. 201180057164.2, a counterpart foreign application of U.S. Pat. No. 8,723,913, 12 pages.

The Chinese Office Action mailed Sep. 26, 2016 for Chinese Patent Application No. 201280052038.2, a counterpart foreign application of U.S. Pat. No. 9,118,801, 18 pages.

Chinese Office Action mailed Jan. 25, 2017 for Chinese Patent Application No. 201180057164.2, a counterpart foreign application of U.S. Pat. No. 8,723,913.

Supplementary European Search Report mailed Apr. 10, 2017 for European Patent Application No. 11831463.2, 11 pages.

* cited by examiner

VIDEO PRESENCE SHARING

RELATED APPLICATIONS

This continuation patent application claims priority to U.S. patent application Ser. No. 13/211,155, filed Aug. 16, 2011, which claims priority to U.S. provisional Patent Application No. 61/390,974, entitled "Real-Time Conversations Through Video Calling," and filed on Oct. 7, 2010. Application Ser. No. 13/211,155 and Application Ser. No. 61/390,974 are both incorporated herein in their entirety by reference.

BACKGROUND

In recent years, telecommunications have advanced from wired calling to wireless calling and from circuit-switched networks to packet-switched networks. In addition to voice calling, telecommunications devices now allow a range of communications, from emails to text messages, support numerous applications, and provide many data services, including Internet browsing and video streaming Internet browsing and video streaming enable a video calling device user to view a streamed video clip from an Internet web site on her video calling device. Convergences of these technologies and others have resulted in support for video calling by video calling devices and their associated service providers. Video calling provides real-time video of the conversation partner to accompany the real-time audio exchanged in any voice or video call.

While the number and types of telecommunication devices and service providers is increasing, many telecommunication devices are unable to engage in video calling or are only able to engage in video calling in the presence of certain network conditions. For example, video calling services may require a telecommunication device to have a camera or be connected to a camera, or may require that a telecommunication device be connected to a certain type of network. This uncertainty of which telecommunication devices are, at any moment, able to engage in a video call makes initiation of such video calls burdensome and infrequent.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for providing video presence statuses of video calling devices to other video calling devices. In some embodiments, each of these video calling devices may determine its presence status based at least on its network connection type and/or network connection details, its login status for a video calling service, and its camera status and provide the presence status to the video calling service. Each video calling device may also receive presence statuses of other video calling devices. This exchange of presence statuses enables initiation of video calls between the video calling devices. A server of the video calling service may receive the video presence statuses from the video calling devices, determine which video calling devices to share a given video presence status with, and provide the given video presence status to those determined video calling devices. In one embodiment, the determined video calling devices include devices that have engaged in communication (i.e., either sending a communication, receiving a communication, or both) with the video calling device having the given video presence status.

In other embodiments, the server of the video calling service may determine the video presence statuses based on received information. This information may include network connection types/network connection details, login statuses, and camera statuses. The information may be received entirely or partly from the video calling devices that it is associated with or may be retrieved entirely or partly from storage of the video calling service.

Example Environment

Figure 1:
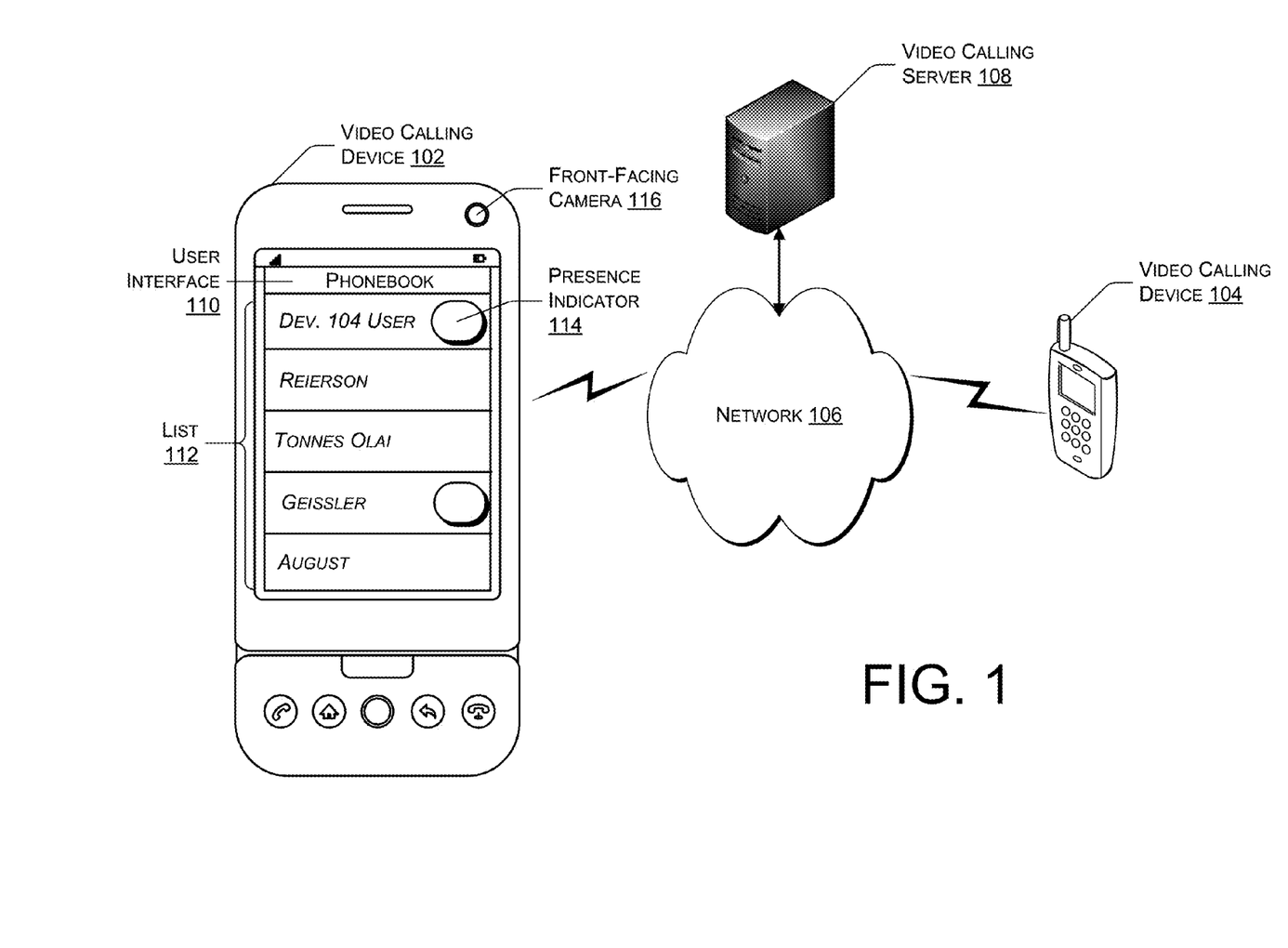
FIG. 1 illustrates an example environment, including multiple video calling devices sharing video presence statuses with each other and engaging in a video call and a server facilitating the sharing and the call, in accordance with various embodiments.

FIG. 1 illustrates an example environment, including multiple video calling devices sharing video presence statuses with each other and engaging in a video call and a server facilitating the sharing and the call, in accordance with various embodiments. As shown in FIG. 1, video calling devices 102 and 104 (also referred to as "first video calling device 102" and "second video calling device 104") are each connected to a network 106 and may engage in video calls over the network 106. To initiate those video calls, the video calling devices 102 and 104 communicate with a video calling server 108. The video calling devices 102 and 104 also receive video presence statuses of each other via the video calling server 108. As is further shown, one of the video calling devices 102 and 104, such as the first video calling device 102, may display on a user interface 110 a list 112 of users of other video calling devices, such as a user of the second video calling device 104. Next to entries of users in the list 112, the first video calling device displays presence indicators 114 representing the received video presence statuses of the users appearing on the list 112. In response to interaction with a presence indicator 114, the first video calling device 102 initiates a video call. Also, one of both of the video calling devices 102 and 104, such as the first video calling device 102, may include a front-facing camera 116 to enable video calling.

In various embodiments, the first video calling device 102 and second video calling device 104 may each be any sort of video calling device, such as a smart phone, a cellular phone, a personal digital assistant (PDA), a personal computer (PC), a laptop, a desktop, a workstation, a media player, a gaming device, a television, a media center, or the like. To enable video calling, each of the first video calling device 102 and second video calling device 104 may be equipped with a front-facing camera 116 (e.g., a camera on the same surface of the video calling device 102/104 as the display) or have a port capable of connecting to a peripheral camera. Each of the first video calling device 102 and second video calling device 104 may be equipped with one or more modules configuring the video calling device 102/104 to determine its video presence status, to exchange video presence statuses with other video calling devices 102/104 through the video calling server 108, to display visual indicators 114 of presence statuses, and to initiate and engage in video calls responsive to interaction with the visual indicators. Examples of such modules of a video calling device 102/104 are illustrated in greater detail in FIG. 2 and are described in detail below with reference to that figure.

In some embodiments, the network 106 may comprise a telecommunication network of a telecommunication service provider that offers a plurality of telecommunication services to video calling devices 102/104, including video calling and/or video presence status sharing. In other embodiments, the network 106 may be a public or private packet network, such as the Internet. In yet other embodiments, the network 106 includes both a telecommunication service provider network and a packet network. The network 106 may include the server 108 and a plurality of computing device connected, for example, by one or more wide area networks (WAN), one or more local area networks (LAN), and/or one or more personal area networks (PAN). Communication between these computing devices of the network 106 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). Any one or more of these protocols may also be used to communicate with video calling devices 102/104 through base stations or other access points and to further communicate with one or more other networks.

In some embodiments, base stations and access points of the network 106 may communication with the video calling devices 102/104 through any of a number of types of networks, including 1G networks, 2G networks, 3G networks, 4G networks, later generation networks, Wi-Fi networks, or Wi-Max networks, among others. As the video calling devices 102/104 move from location to location, they may access the network 106 through different base stations and access points offering different types of networks. For example, a first base station may offer a 4G network and a second base station may offer a 2G network. As a video calling device 102/104 moves from a cell of the first base station to a cell of the second base station, the video calling device 102/104 transitions from a 4G network connection to a 2G network connection. In one embodiment, the cell associated with the second base station may include a location associated with a WiFi network. In such an embodiment, when the video calling device 102/104 arrives at the location associated with the WiFi network, it may connect to the WiFi network in place of the 2G network. In some embodiments, the video calling device 102/104 determines the type of the network (3G, 4G, etc.) that it is currently connected to and utilizes the network connection type in determining its video presence status. The video calling device 102/104 may also monitor changes in its network connection type as it moves from location to location and may update its video presence status accordingly.

While the video calling server 108 is shown as a single computing device, the video calling server 108 may be implemented in any one or more computing devices, such as PCs, laptop computers, workstations, server systems, mainframes, server farms, or any other computing devices. The computing device(s) constituting the video calling server 108 may also be connected by one or more networks, such as WANs, LANs, PANs, or the Internet and may utilize any sort of communication protocol known in the art for sending and receiving messages, such as TCP/IP, HTTP, or any other protocol. Also, modules and data of the video calling server 108 may be implemented in a single computing device or disturbed among multiple computing devices of the video calling server 108. The video calling server 108 may be equipped with one or more modules configuring the video calling server 108 to receive or determine video presence statuses for video calling devices 102 and 104, to conditionally provide the video presence status of one video calling device 102/104 to one or more other video calling devices 102/104, and to facilitate video calls between video calling devices 102/104. Examples of such modules of a video calling server 108 are illustrated in greater detail in FIG. 3 and are described in detail below with reference to that figure.

In various embodiments, each video calling device 102 and 104 has a display configured to render graphics, such as the user interface 110. This user interface 110 may be associated with a platform of a video calling device 102/104 or with an application, such as a video calling client or with a contact list or phonebook. As shown in FIG. 1, the user interface 110 includes a list 112 of users. This list 112 may include only users of other video calling devices 102/104 or may include both uses of video calling devices 102/104 and of other computing and telecommunication devices. The list may represent a single contact list of the video calling device 102/104 or an agglomeration of contact lists of the video calling device 102/104. Also, the list 112 may be associated with a single video calling client or with multiple video calling clients. In one embodiment, the list 112 is associated with an enhanced phonebook that includes users of multiple video calling services and receives video presence statuses from those multiple video calling services.

In some embodiments, one or more entries of the list 112 may be associated with presence indicators 114. These presence indicators 114 correspond to video presence statuses received from one or more video calling servers 108 of one or more video calling services and are updated on a pre-determined or event-driven basis. The presence indicators 114 comprise visual indicia, such as an image or video clip, and may be personalized for the users that they are associated with or shared across multiple users. For example, one image may be used to indicate that a user is "online" for video calling and another may indicate that a user is "offline" for video calling. In another example, a single presence indicator 114 is used to indicate that a user is "online" for video calling. In this example, users that are "offline" for video calling may not have presence indicators 114 displayed in their entries in the list 112. In some embodiments, the user of the video calling device 102/104 displaying the presence indicators 114 may initiate a video call with another video calling device 102/104 by interacting with the presence indicator 114 for that other video calling device 102/104. Such interaction may compromise touch interaction with the presence indicator 114 if the display of the video calling device 102/104 is a touch-sensitive display, touch interaction with some other key, button, or control of the video calling device 102/104, or voice input. In one embodiment, the interaction comprises single-touch initiation of a video call by a single press of a portion of display occupied by the presence indicator 114 associated with the called party.

Example Systems

Figure 2:
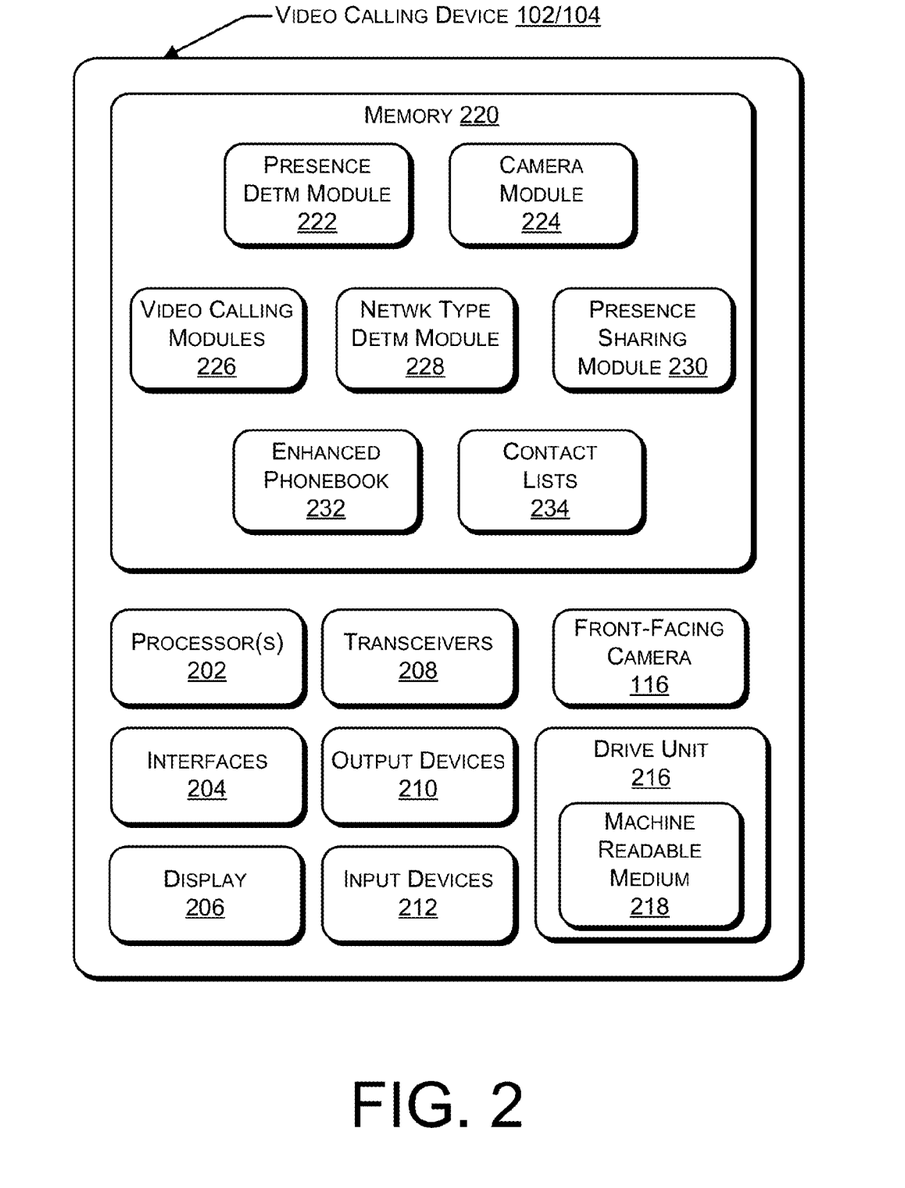
FIG. 2 illustrates an example video calling device system architecture, in accordance with various embodiments.

FIG. 2 illustrates an example video calling device system architecture, such as a system architecture of one or both of the first video calling device 102 or the second video calling device 104, in accordance with various embodiments. As shown, the first video calling device 102 or the second video calling device 104 includes processor(s) 202, interfaces 204, a display 206, transceivers 208, output devices 210, input devices 212, a front-facing camera 116, and drive unit 216 including a machine readable medium 218. The first video calling device 102 or the second video calling device 104 also includes a memory 220, the memory 2200 storing a presence determination module 222, a camera module 224, video calling modules 226, a network type determination module 228, a presence sharing module 230, an enhanced phonebook 232, and contact lists 234.

In some embodiments, the processor(s) 202 is a central processing unit (CPU), a graphics processing unit (GPU), or both CPU and GPU, or any other sort of processing unit.

In various embodiments, the interfaces 204 are any sort of interfaces. Interfaces 204 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the first video calling device 102 or the second video calling device 104 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into the first video calling device 102 or the second video calling device 104.

In various embodiments, the display 206 is a liquid crystal display or any other type of display commonly used in video calling devices. For example, display 206 may be a touch-sensitive display screen, and can then also act as an input device or keypad, such as for providing a soft-key keyboard, navigation buttons, or the like.

In some embodiments, the transceivers 208 include any sort of transceivers known in the art. For example, transceivers 208 may include a radio transceiver and interface that performs the function of transmitting and receiving radio frequency communications via an antenna. The radio interface facilitates wireless connectivity between the first video calling device 102 or the second video calling device 104 and various cell towers, base stations and/or access points.

In some embodiments, the output devices 210 include any sort of output devices known in the art, such as a display (already described as display 206), speakers, a vibrating mechanism, or a tactile feedback mechanism. Output devices 210 also include ports for one or more peripheral devices, such as headphones, peripheral speakers, or a peripheral display.

In various embodiments, input devices 212 include any sort of input devices known in the art. For example, input devices 212 may include a microphone, a keyboard/keypad, or a touch-sensitive display. A keyboard/keypad may be a push button numeric dialing pad (such as on a typical video calling device), a multi-key keyboard (such as a conventional QWERTY keyboard), or one or more other types of keys or buttons, and may also include a joystick-like controller and/or designated navigation buttons, or the like.

As mentioned above, the video calling devices 102 and 104 may also each include a front-facing camera 116 (i.e., a camera on the same surface of the video calling device 102/104 as the display 206) or port for an attachment to a peripheral camera.

The machine readable medium 218 stores one or more sets of instructions (e.g., software) embodying any one or more of the methodologies or functions described herein. The instructions may also reside, completely or at least partially, within the memory 220 and within the processor(s) 202 during execution thereof by the first video calling device 102 or the second video calling device 104. The memory 220 and the processor(s) 202 also may constitute machine readable media 218.

In various embodiments, memory 220 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 220 includes a SIM (subscriber identity module) card, which is a removable memory card used to identify a user of the first video calling device 102 or the second video calling device 104 to a telecommunication network, such as network 106. Memory 220 can also be described as computer storage media and may include volatile and nonvolatile, removable and non-removable media implemented in any method or technology for storage of information, such as computer readable instructions, data structures, program modules, or other data.

As previously mentioned, the memory 220 stores a presence determination module 222, a camera module 224, video calling modules 226, a network type determination module 228, a presence sharing module 230, an enhanced phonebook 232, and contact lists 234. These modules and data may comprise any one or more modules, applications, processes, threads, classes, algorithms, data structures, files, and/or databases.

In various embodiments, the presence determination module 222 determines the video presence status of the video calling device 102/104 on a periodic or event-driven basis. For example, the presence determination module 222 may determine the video presence status every n time units or in response to receiving an alert that network connectivity has been gained, lost, or changed. In order to determine the video presence status, the presence determination module 222 invokes the camera module 224, video calling modules 226, and network type determination module 228.

The camera module 224 interfaces with the front-facing camera 116 and can provide an indication of whether the front-facing camera 116 is operational. In some embodiments, a setting may be stored in place of the camera module 224 and may indicate whether the video calling device 102/104 has a front-facing camera 116. Such a setting may be stored in any data structure, file, or database of the video calling device 102/104. In one embodiment, the setting is a setting of the presence determination module 222 and is stored in a data structure of the presence determination module 222.

In some embodiments, the one or more video calling modules 226 are respectively clients of one or more video calling services associated with video calling servers 108. In response to queries from the presence determination module 222, the video calling modules 226 return indications of whether they are logged into their respective video calling services. In one embodiment, responsive to queries from the presence determination module 222, the video calling modules 226 may prompt the user to login into the video calling services if the user is not currently logged into those services.

Also, in some embodiments, the video calling modules 226 may register with their respective video calling services upon installation or first use. As part of the registration, the video calling modules 226 may provide an indication of whether the video calling device 102/104 includes a front-facing camera 116.

In various embodiments, the network type determination module 228 determines whether the video calling device 102/104 is currently connected to a network and, if so, what type of network the video calling device 102/104 is connected to. The network type determination module 228 may retrieve this information from other modules or a platform of the video calling device 102/104 or from the network 106 or from a video calling server 108. Upon retrieving or determining the network connection type, the network type determination module 228 returns an indication of the network connection type to the presence determination module 222. In some embodiments, the network type determination module 228 also determines details of the network connection, such as a quality of service (QoS) (e.g., a guaranteed bit rate) associated with the network connection, and returns an indication of those details to the presence determination module.

In some embodiments, the presence determination module 222 receives responses from the camera module 224, video calling modules 226, and network type determination module 228 and determines the video presence status based on the responses. The video presence status may be one of "online" or "offline" and the presence determination module 222 may determine a separate video presence status for each video calling service associated with a video calling module 226. So if the video calling device 102/104 has three video calling modules 226, then the presence determination module 222 may determine three video presence statuses. For each respective video calling service/video calling module 226, then, the presence determination module 222 may determine that the video presence status is "online" if 1) the video calling device has a front-facing camera 116, 2) the video calling device 102/104 is logged into the respective video calling service, and 3) the network connection type is one of a specified group of one or more network connection types an/or the details of the network connection (e.g., QoS) meet specified criteria. Such a group of network connection types may include, for example, 3G, 4G, and WiFi networks. If any one of these conditions is not met, the presence determination module 222 determines that the video presence is "offline" for that respective video calling service. Upon determining the one or more video presence statuses, the presence determination module 222 invokes the presence sharing module 230 and provides the one or more video presence statuses to the presence sharing module 230.

In other embodiments, rather than determining the one or more video presence statuses, the presence determination module 222 may provide one or more of the received network connection type, login status(es), or camera status to the presence sharing module 230 to enable the presence sharing module 230 to provide that information to the video calling server 108 of a video calling service. That video calling server 108 may then determine the video presence status based at least in part on the information.

In some embodiments, the presence determination module 222 continues to operate on a periodic or event-driven basis, monitoring the network connection type/network connection details and the login status and updating the one or more video presence statuses based on any changes to the network connection type/network connection details or login status.

In various embodiments, presence sharing module 230 provides the one or more video presence statuses or information (network connection type/network connection details, logic status, and/or camera status) to the respective one or more video calling services associated with the video calling modules 226. As mentioned above, different video presence statuses may be provided to different video calling services. For example, if the video calling device 102/104 is logged into one video calling service and logged out of another, the presence sharing module 230 may provide an "online" video presence status to the former and an "offline" video presence status to the latter.

Also in various embodiments, the presence sharing module 230 receives video presence statuses of other video calling devices 102/104 from the video calling servers 108 associated with the video calling services. The presence sharing module 230 may receive these prior to, after, or concurrently with providing the video presence statuses of the video calling device 102/104 to the video calling services. The presence sharing module 230 then stores the received video presence statuses for retrieval in response to a requests from video calling device 102/104 applications or invokes the video calling device 102/104 applications to provide the video presence statuses to the applications. In one embodiment, the received video presence statuses may be stored in connection with the enhanced phonebook 232 or contact lists 234.

In some embodiments, the presence sharing module 230 also provides a video calling service with a list of users permitted to receive the video presence status along with that video presence status. This list may include all contacts or a subset of contacts, the contacts belonging to a contact list associated with the receiving video calling service, with multiple ones of the video calling services, and/or with other applications/communication modalities. The presence sharing module 230 may determine the list automatically or may allow users to manually configure one or more lists. In one embodiment, the presence sharing module 230 includes in the list other users that the user of the video calling device 102/104 has communicated with, such as other users that the user has called or has received a call from, emailed or received an email from, or messaged or received a message from.

In various embodiments, the enhanced phonebook 232 is an application that lists users of multiple ones of the video calling services and/or other contacts. Identities of these users may be drawn from contact lists 234 of the video calling modules 226 associated with the video calling services or from other contact lists 234, such as email contact lists 234 or a contact list 234 maintained by a platform of the video calling device 102/104. The enhanced phonebook 232 may be navigated to and activated by a user of the video calling device 102/104. When activated, the enhanced phonebook 232 may provide a user interface such as the user interface 110. The enhanced phonebook 232 may also receive or retrieve the video presence statuses of its contacts from the presence sharing module 230 or from storage written to by the presence sharing module 230. The enhanced phonebook 232 may then receive an indication that a user has interacted with one of the presence indicators 114 included in the user interface 110 and may invoke a video calling module 226 associated with the interacted-with contact to initiate a video call to the interacted with contact over the network 106.

Figure 3:
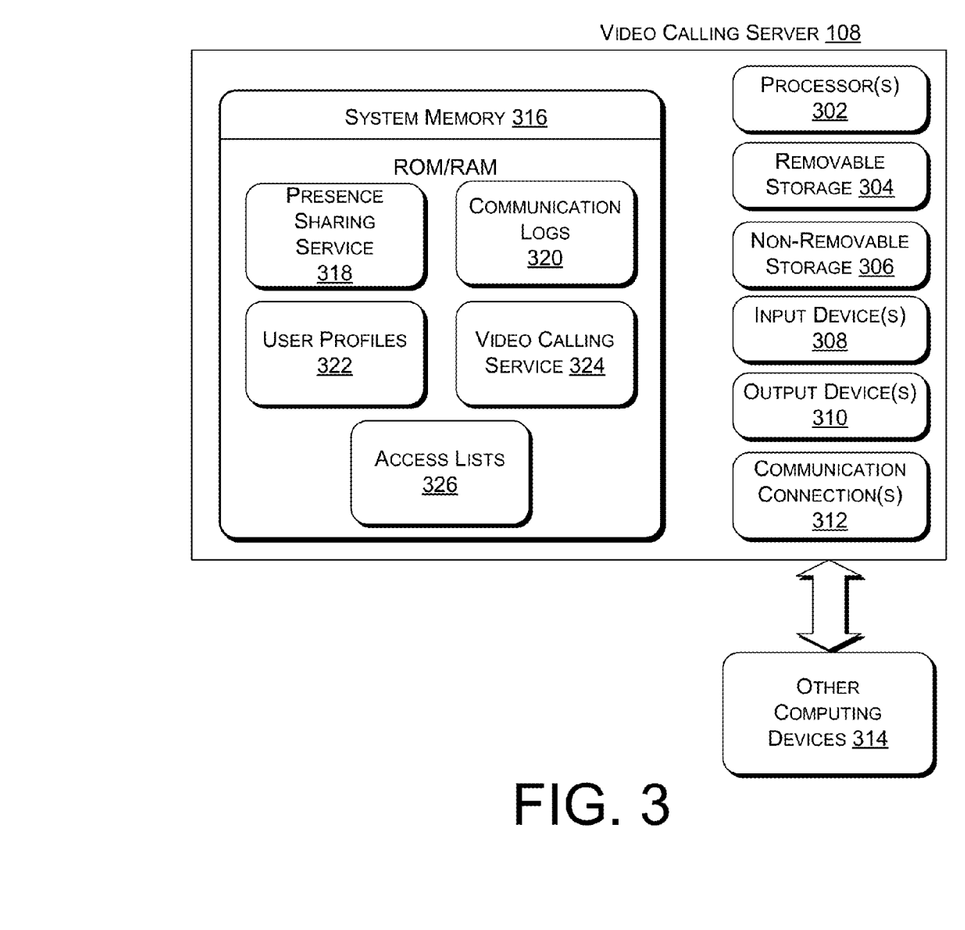
FIG. 3 illustrates an example server system architecture, in accordance with various embodiments.

FIG. 3 illustrates an example server system architecture, such as a system architecture of the video calling server 108, in accordance with various embodiments. As illustrated, the video calling server 108 includes processor(s) 302, a removable storage 304 and non-removable storage 306, input device(s) 308, output device(s) 310, and communication connections 312 for communicating with other computing devices 314. The video calling server 108 also comprises a system memory 316. The system memory 316 stores a presence sharing service 318, communication logs 320, user profiles 322, a video calling service 324, and access lists 326.

In some embodiments, the processor(s) 302 is a central processing unit (CPU), a graphics processing unit (GPU), or both CPU and GPU, or other processing unit or component known in the art.

The video calling server 108 includes data storage devices (removable and/or non-removable) in addition to the system memory 316, such as, for example, magnetic disks, optical disks, or tape. Such additional storage is illustrated in FIG. 3 by removable storage 304 and non-removable storage 306. Computer storage media may include volatile and nonvolatile, removable and non-removable media implemented in any method or technology for storage of information, such as computer readable instructions, data structures, program modules, or other data. System memory 316, removable storage 304 and non-removable storage 306 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the video calling server 108. Any such computer-readable storage media may be part of the video calling server 108.

In various embodiment, any or all of system memory 316, removable storage 304, and non-removable storage 306 store programming instructions which, when executed, implement some or all of the above-described operations of the video calling server 108.

The video calling server 108 also has input device(s) 310, such as a keyboard, a mouse, a touch-sensitive display, voice input device, etc., and output device(s) 312 such as a display, speakers, a printer, etc. These devices are well known in the art and need not be discussed at length here.

The video calling server 108 also contains communication connections 314 that allow the video calling server 108 to communicate with other computing devices 316, such as the first video calling device 102 and second video calling device 104.

In various embodiments, system memory 316 is volatile (such as RAM), non-volatile (such as ROM, flash memory, etc.) or some combination of the two. Example system memory 316 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 316 stores a presence sharing service 318, communication logs 320, user profiles 322, a video calling service 324, and access lists 326. These modules and data may comprise any one or more modules, applications, processes, threads, classes, algorithms, data structures, files, and/or databases.

In various embodiments, the presence sharing service 318 receives video presence statuses from video calling devices 102/104 or determines video presence statuses for video calling devices 102/104, determines other video calling devices 102/104 that should receive the received/determined video presence statuses, and provides the received/determined video presence statuses to those other video calling devices 102/104.

In some embodiments, the presence sharing service 318 receives the video presence statuses and stores them in an accessible, local or remote data structure, file, or database. In other embodiments, the presence sharing service 318 receives information in place of the video presence statuses. This information may include any one or more of the network connection types/network connection details, login statuses, or camera statuses of the video calling devices 102/104. The presence sharing service 318 then determines the rest of the information by retrieving user profiles 322 or invoking video calling service 324. The user profiles 322 may store the camera statuses of video calling devices 102/104, as well as current login statuses and network connection types/network connection details. The video calling service 324 may also be configured to determine and provide network connection types/network connection details and login statuses of video calling devices 102/104. In yet other embodiments, the presence sharing service 318 does not receive information from video calling devices 102/104 but, instead, retrieves the information from user profiles 322 and/or invokes the video calling service 324.

Once this information has been received or retrieved, the presence sharing service 318 determines video presence statuses for the video calling devices 102/104. The presence sharing service 318 may determine that a video presence status for a respective video calling device 102/104 is "online" if 1) the respective video calling device 102/104 has a front-facing camera 116, 2) the respective video calling device 102/104 is logged into the video calling service 324, and 3) the network connection type of the respective video calling device 102/104 is one of a specified group of one or more network connection types and/or the network connection details (e.g., QoS) meet specified criteria. Such a group of network connection types may include, for example, 3G, 4G, and WiFi networks. If any one of these conditions is not met, the presence sharing service 318 determines that the video presence is "offline" for that respective video calling device 102/104.

In various embodiments, once the presence sharing service 318 has received or determined the video presence statuses, the presence sharing service 318 determines which video calling devices 102/104 to share each video presence status with. In some embodiments, the presence sharing service 318 determines which devices 102/104 to share each video presence status with based on access lists 326 received from video calling devices 102/104. These access lists 326 may be received with the video presence statuses and stored locally for future reference. In other embodiments, the access lists 326 may be provided separately, such as when video calling devices 102/104 register with the video calling service 324.

In other embodiments, the presence sharing service 318 determines which devices 102/104 to share each video presence status with based on communication logs 320. The communication logs 320 may include logs of emails exchanged between video calling devices 102/104, voice and video calls between video calling devices 102/104, and/or text or instant messages exchanged between video calling devices 102/104. In some embodiments, the presence sharing service 318 shares the video presence status of a second video calling device 104 with a first video calling device 102 if the second video communication device 104 has previously called, emailed, or messaged the first video calling device 102.

In various embodiments, the video calling service 324, registers video calling devices 102/104 in response to registration requests from these video calling devices 102/104. The registration requests may include camera statuses and/or access lists 326. The video calling service 324 may then store the camera statuses in respective user profiles 322 for future retrieval. Also, as mentioned above, video calling service 324 may also determine the network connection types/network connection details and the login statuses of the video calling devices 102/104 and provide these to the presence sharing service 318. Additionally, the video calling service 324 may establish video calls between video calling devices 102/104.

Example Operations

Figure 4:
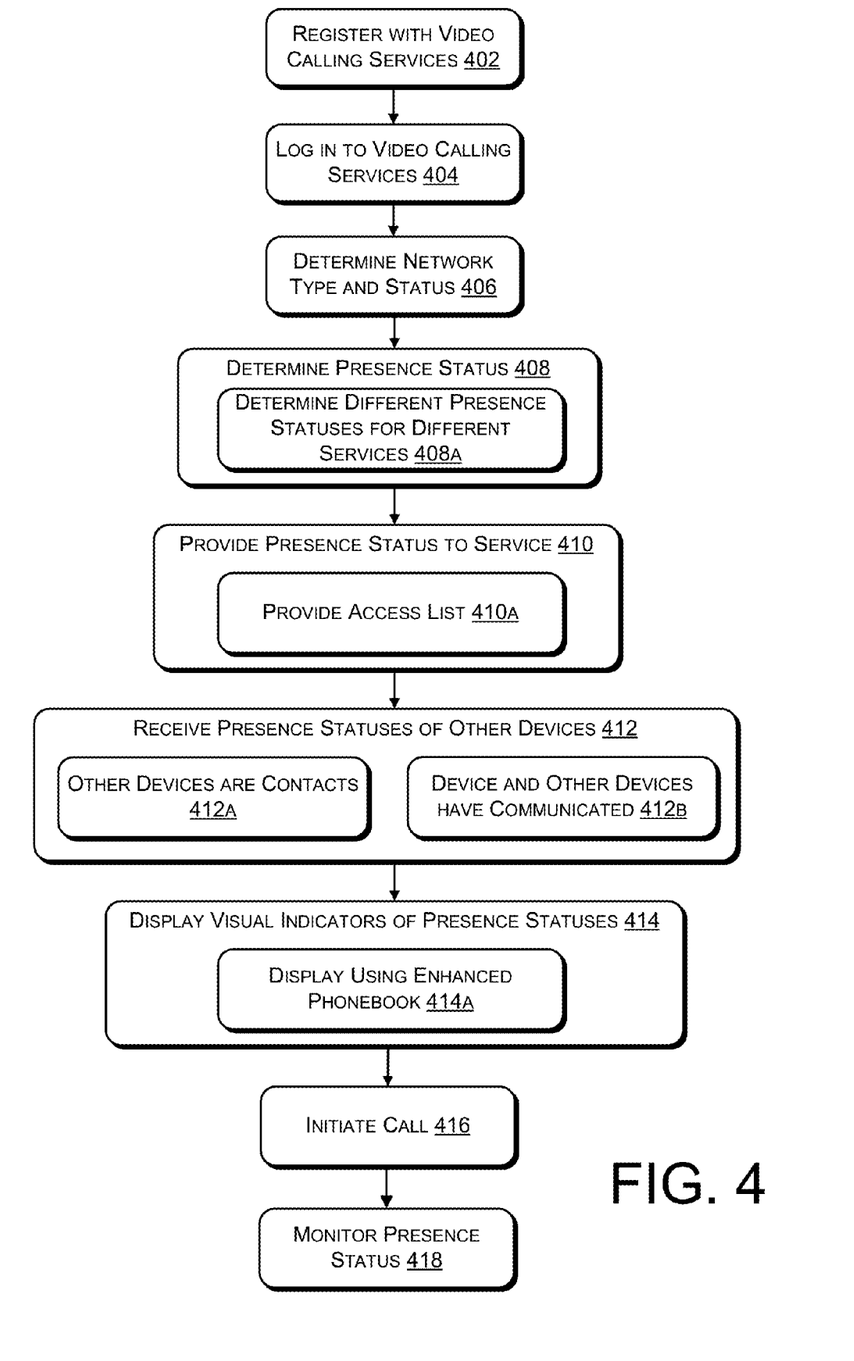
FIG. 4 illustrates a flowchart showing an example video-calling-device-implemented method of exchanging and displaying video presence statuses of video calling devices, in accordance with various embodiments.

FIG. 4 illustrates a flowchart showing an example video-calling-device-implemented method of exchanging and displaying video presence statuses of video calling devices, in accordance with various embodiments. As shown at block 402, a video calling device may register with one or more video calling services. In one embodiment, the registration may include providing an indication of whether the registering video calling device has a front-facing camera. At block 404, a user of the video calling device, or the video calling device itself, may then log in to one or more video calling services. At block 406, the video calling device may then determine its network connection type/network connection details. In other embodiments, the operations of blocks 404 and 406 may be performed in a different order or performed concurrently.

At block 408, the video calling device then determines its video presence status based on its network connection type/network connection details, its login status, and its camera status. In some embodiments, at block 408a, the video calling device includes multiple video calling clients and determines a different video presence status for each video calling service associated with a video calling client. For example, if the video calling device is logged into one video calling service but logged out of another, it may determine that the video presence status for the first is "online" and the video presence status for the second is "offline." In one embodiment, the video calling device determines that it is "online" when the network connection type indicates that the network is a 3G, 4G, or WiFi network and/or when the network connection details indicate that specified criteria are met, when a login status indicates that the video calling device is logged into a video calling service, and when the camera status indicates that the video calling device has a front-facing camera.

At block 410, the video calling device then provides its video presence status or statuses to the video calling service(s). At block 410a, the video calling device may also provide an access list or lists or other users that may receive the determined video presence status.

At block 412, the video calling device then receives video presence statuses of other video calling devices. At block 412a, the video calling device receives video calling statuses of other video calling devices that are contacts of the user of the video calling device. At block 412b, the video calling device receives video calling statuses of other video calling devices that the video calling device has communicated with. For example, the video calling device may receive presence statuses of other video calling devices that the video calling device has called or has received a call from, emailed or received an email from, or messaged or received a message from.

At block 414, the video calling device displays visual indicators of the video presence statuses of the other video calling devices. At block 414a, the video calling device displays these visual indicators as part of a user interface of an enhanced phonebook that includes contacts from multiple applications, communication modalities, and video calling services of the video calling device. At block 416, responsive to interaction with one of the visual indicators, the video calling device initiates a video call with the other video calling device that is associated with the interacted-with visual indicator.

At block 418, the video calling device monitor the network connection type/network connection details of the network that the video calling device is currently connected to, updates the video presence status or statuses accordingly, and provides the updated video presence status or statuses to the video calling service(s).

Figure 5:
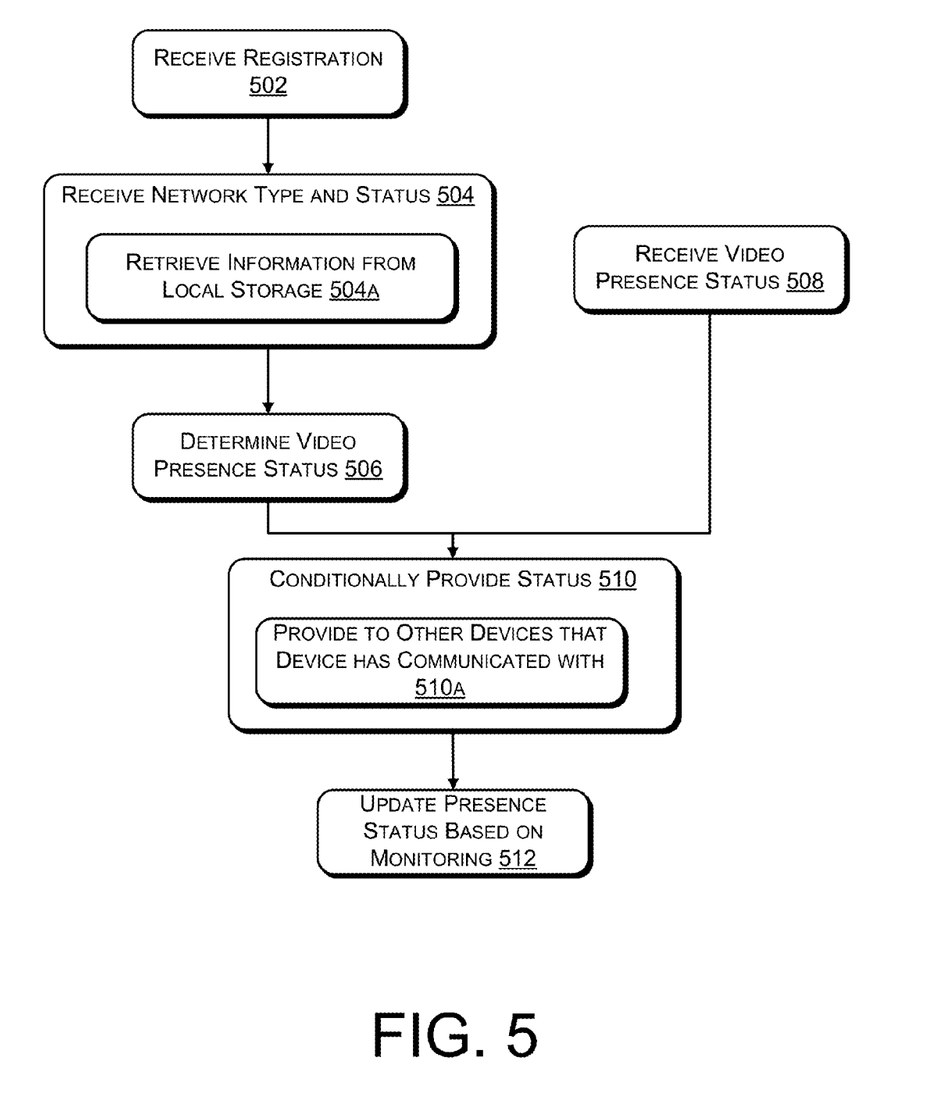
FIG. 5 illustrates a flowchart showing an example video-calling-server-implemented method of providing video presence statuses to multiple video calling devices, in accordance with various embodiments.

FIG. 5 illustrates a flowchart showing an example video-calling-server-implemented method of providing video presence statuses to multiple video calling devices, in accordance with various embodiments. At block 502, a video calling server receives a registration from a video calling device. The registration may include an indication of whether the video calling device has a front-facing camera. At block 504, the video calling server receives information indicating network connection types/network connection details and camera statuses of video calling devices and login statuses of users of video calling devices. At block 504a, the receiving comprises retrieving the information from storage of the video calling server. At block 506, the video calling server determines video presence statuses for video calling devices based on the network connection types/network connection details, login statuses, and camera statuses of the video calling devices.

In other embodiments, as shown at block 508, the video calling server may receive the video presence statuses rather than determine those statuses.

At block 510, the video calling server conditionally provides a specific video presence status of a specific video calling device to other video calling devices. At block 510a, the video calling server provides the specific video presence status to other video calling devices that the specific video calling device has communicated with.

At block 512, the video calling server updates and provides the video presence statuses based on monitoring the network connection types/network connection details of the video calling devices.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A video calling device comprising:
a processor;
a front-facing camera coupled to the processor; and executable instructions configured to be operated by the processor to perform operations including:
  determining a presence status for the video calling device based at least on:
    a network connection type of a network that the video calling device is connected to, and
    a login status that indicates that the video calling device is logged into a video calling service; and
  exchanging presence status information with one or more other video calling devices to enable initiation of video calls between the video calling device and the one or more other video calling devices, the exchanging including at least:
    providing the presence status of the video calling device to the video calling service, and
    receiving one or more other presence statuses associated with the one or more other video calling devices from the video calling service.

2. The video calling device of claim 1, wherein the presence status indicates that the video calling device is able to engage in video calls when:
  the network connection type indicates that the network is a 3G, 4G, or WiFi network, and
  a camera status indicates that the video calling device has the front-facing camera.

3. The video calling device of claim 1, wherein the video calling device is registered with multiple video calling services.

4. The video calling device of claim 3, wherein the video calling device is logged into a first video calling service of the multiple video calling services and logged out of a second video calling service of the multiple video calling services, and the operations include:
  determining a first presence status for the first video calling service indicating that the video calling device is able to engage in video calls, and
  determining a second presence status for the second video calling service indicating that the video calling device is not able to engage in video calls.

5. The video calling device of claim 3, wherein the operations further include providing an enhanced phonebook user interface that includes visual indicators of presence statuses of the other video calling devices, wherein the presence statuses are received from multiple ones of the video calling services.

6. The video calling device of claim 1, wherein the operations include monitoring the network connection type, updating the presence status based on the monitoring, and providing the updated presence status to the video calling service.

7. The video calling device of claim 1, wherein the operations include displaying, within a user interface of an enhanced phonebook application that is installed on the video calling device and that accesses a contacts list of the video calling device, visual indicators of the one or more other presence statuses associated with the one or more other video calling devices.

8. The video calling device of claim 7, wherein the operations include initiating a video call with a particular video calling device of the one or more other video calling devices responsive to interaction with a particular visual indicator, of the visual indicators, that is associated with that the particular video calling device.

9. The video calling device of claim 1, wherein the one or more other video calling devices are contacts of the video calling device.

10. The video calling device of claim 1, wherein the receiving comprises receiving presence statuses for other video calling devices that the video calling device has called or has received a call from, emailed or received an email from, or messaged or received a message from.

11. The video calling device of claim 1, wherein the operations include providing the video calling service with a list of other video calling devices permitted to receive the presence status of the video calling device.

12. A method comprising:
  receiving, by a video calling server, presence statuses from a plurality of video calling devices; and
  conditionally providing, by the video calling server, a first presence status of a first video calling device to one or more others of the video calling devices based at least on whether the first video calling device and the one or more other video calling devices have communicated with each other,
  wherein the presence statuses are determined based at least on network connection types of networks that the video calling devices are connected to or network connection details associated with connections to those networks, login statuses of the video calling devices, and camera statuses of the video calling devices.

13. The method of claim 12, further comprising determining, by video calling server, the presence statuses.

14. The method of claim 12, wherein the presence statuses indicate that the video calling devices are able to engage in video calls when:
  the network connection types indicate that the networks are 3G, 4G, or WiFi networks,
  the login statuses indicate that the video calling devices are logged into a video calling service of the video calling server, and
  the camera statuses indicate that the video calling devices have front-facing cameras.

15. The method of claim 12, further comprising receiving updated presence statuses based on monitoring of network connection types and conditionally providing the updated presence statuses.

16. One or more computer storage devices comprising a plurality of computer-executable instructions stored thereon and configured to program a video calling service to perform operations including:
  receiving information associated with at least one of network connection types of networks that a plurality of video calling devices are connected to, network connection details associated with connections to the networks, or camera statuses of the video calling devices;
  determining login statuses that indicate whether individual ones of the video calling devices are currently logged into the video calling service;
  determining presence statuses for the video calling devices based at least on the login statuses and the received information; and
  providing a first presence status of a first video calling device to one or more other ones of the video calling devices based at least on an association between the first video calling device and the one or more other ones of the video calling devices.

17. The one or more computer storage devices of claim 16, wherein the operations include receiving a registration from one of the video calling devices, the registration specifying a camera status of that video calling device.

18. The one or more computer storage devices of claim 17, wherein the receiving of the information comprises retrieving the network connection types, the network connection details, the login statuses, or the camera statuses for the video calling devices from storage of the video calling service.

19. The one or more computer storage devices of claim 16, wherein the association between the first video calling device and the one or more other ones of the video calling devices is that:
- the first video calling device initiated a call to or received a call from the one or more other ones of the video calling devices,
- the first video calling device emailed or received an email from the one or more other ones of the video calling devices,
- the first video calling device messaged or received a message from the one or more other ones of the video calling devices, or
- the one or more other ones of the video calling devices are contacts of the video calling device.

* * * * *